United States Patent
Goujon et al.

(10) Patent No.: US 10,928,528 B2
(45) Date of Patent: Feb. 23, 2021

(54) COMPUTING ROTATION DATA USING A GRADIENT OF TRANSLATIONAL DATA

(71) Applicant: WESTERNGECO LLC, Houston, TX (US)

(72) Inventors: Nicolas Goujon, Asker (NO); Pascal Guillaume Edme, Cambridge (GB); Artem Kashubin, East Grinstead (GB); Everhard Johan Muijzert, Cambridge (GB)

(73) Assignee: WesternGeco L.L.C., Houston, TX (US)

( * ) Notice: Subject to any disclaimer, the term of this patent is extended or adjusted under 35 U.S.C. 154(b) by 447 days.

(21) Appl. No.: 15/426,957

(22) Filed: Feb. 7, 2017

(65) Prior Publication Data
US 2017/0146673 A1 May 25, 2017

Related U.S. Application Data (62) Division of application No. 14/158,115, filed on Jan. 17, 2014, now Pat. No. 9,594,174.

(60) Provisional application No. 61/759,466, filed on Feb. 1, 2013, provisional application No. 61/868,429, filed on Aug. 21, 2013.

(51) Int. Cl.
*G01V 1/16* (2006.01)
*G01V 1/30* (2006.01)
*G01V 13/00* (2006.01)
*G01V 1/18* (2006.01)

(52) U.S. Cl.
CPC ............ *G01V 1/162* (2013.01); *G01V 1/181* (2013.01); *G01V 1/30* (2013.01); *G01V 13/00* (2013.01); *G01V 1/185* (2013.01); *Y10T 29/49002* (2015.01)

(58) Field of Classification Search
None
See application file for complete search history.

(56) References Cited

U.S. PATENT DOCUMENTS 2,657,373 A * 10/1953 Piety ................. G01V 1/16
367/58
2,705,314 A 3/1955 Gaby
(Continued)

FOREIGN PATENT DOCUMENTS

EP 0457644 B1 2/1994
EP 0736781 A1 10/1996
(Continued)

OTHER PUBLICATIONS

International Search Report and Written Opinion for the cross referenced International patent application PCT/US2014/013866 dated May 8, 2014 (15 pages).
(Continued)

*Primary Examiner* — Hovhannes Baghdasaryan
(74) *Attorney, Agent, or Firm* — Fletcher Yoder, PC (57) ABSTRACT

Translational data in a first direction is measured by particle motion sensors contained in an elongated housing of a sensor device provided at an earth surface. The particle motion sensors are spaced apart along a second, different direction along a longitudinal axis of the elongated housing. Rotation data around a third direction is computed based at least in part on computing a gradient of the translational data with respect to the second direction.

19 Claims, 3 Drawing Sheets

(56) References Cited

U.S. PATENT DOCUMENTS

| | | | |
|---|---|---|---|
| 3,391,335 A * | 7/1968 | Patton | G01V 3/26 |
| | | | 324/346 |
| 3,722,751 A | 3/1973 | Bisciglia | |
| 3,930,218 A | 12/1975 | Hall, Jr. | |
| 3,934,218 A | 1/1976 | Bobb | |
| 4,134,097 A | 1/1979 | Cowles | |
| 4,163,206 A | 7/1979 | Hall, Jr. | |
| 4,186,373 A * | 1/1980 | Thompson | G01N 29/11 |
| | | | 181/108 |
| 4,300,220 A | 11/1981 | Goff et al. | |
| 4,334,296 A | 6/1982 | Hall, Jr. | |
| 4,520,467 A | 5/1985 | Berni | |
| 4,554,648 A | 11/1985 | Greer et al. | |
| 4,558,439 A | 12/1985 | Gudesen | |
| 4,599,713 A | 7/1986 | Rudaz | |
| 4,890,264 A | 12/1989 | Crews et al. | |
| 4,979,150 A | 12/1990 | Barr | |
| 4,996,675 A | 2/1991 | Beauducel | |
| 5,010,531 A | 4/1991 | McNeel | |
| 5,088,681 A * | 2/1992 | Procaccianti | E02D 5/801 |
| | | | 248/156 |
| 5,124,956 A | 6/1992 | Rice et al. | |
| 5,214,614 A | 5/1993 | Baule | |
| 5,365,491 A | 11/1994 | Sullivan et al. | |
| 5,555,530 A | 9/1996 | Meehan | |
| 5,621,699 A | 4/1997 | Rigsby et al. | |
| 5,648,938 A | 7/1997 | Jakubowicz | |
| 5,757,720 A | 5/1998 | Soubaras | |
| 5,890,264 A | 4/1999 | Shofner et al. | |
| 6,172,940 B1 | 1/2001 | McConnell et al. | |
| 6,288,976 B1 | 9/2001 | Ambs | |
| 6,301,195 B1 | 10/2001 | Faber | |
| 6,314,371 B1 | 11/2001 | Monk | |
| 6,330,512 B1 | 12/2001 | Thomas et al. | |
| 6,335,577 B1 | 1/2002 | Baba | |
| 6,353,577 B1 | 3/2002 | Orban et al. | |
| 6,381,544 B1 | 4/2002 | Sallas et al. | |
| 6,442,304 B1 | 8/2002 | Crawley et al. | |
| 6,446,009 B1 | 9/2002 | Baeten et al. | |
| 6,584,038 B2 | 6/2003 | Meunier | |
| 6,607,050 B2 | 8/2003 | He et al. | |
| 6,712,141 B1 | 3/2004 | Bussear et al. | |
| 6,791,901 B1 | 9/2004 | Robertsson et al. | |
| 6,814,160 B1 | 11/2004 | Scott | |
| 6,814,179 B2 | 11/2004 | Corrigan et al. | |
| 6,868,356 B2 | 3/2005 | Nai et al. | |
| 6,894,948 B2 | 5/2005 | Brittan et al. | |
| 6,932,185 B2 | 8/2005 | Bary et al. | |
| 6,961,283 B2 | 11/2005 | Kappius et al. | |
| 7,082,079 B2 | 7/2006 | Woo | |
| 7,142,481 B1 | 11/2006 | Metzbower et al. | |
| 7,252,174 B2 | 8/2007 | Cox et al. | |
| 7,286,938 B2 | 10/2007 | Amundsen et al. | |
| 7,474,591 B2 | 1/2009 | Menard et al. | |
| 7,520,467 B2 | 4/2009 | Cilffre et al. | |
| 7,551,517 B2 | 6/2009 | Berg et al. | |
| 7,616,114 B2 | 11/2009 | Tonelli et al. | |
| 7,656,746 B2 | 2/2010 | De Kok et al. | |
| 7,710,822 B2 | 5/2010 | Harmon | |
| 7,916,576 B2 | 3/2011 | Beasley et al. | |
| 8,199,611 B2 | 6/2012 | Goujon | |
| 8,520,469 B2 | 8/2013 | Ronnow et al. | |
| 8,654,606 B2 | 2/2014 | Muyzert et al. | |
| 8,665,671 B2 | 3/2014 | Muyzert et al. | |
| 8,712,694 B2 | 4/2014 | Edme et al. | |
| 8,755,643 B2 | 6/2014 | Nash et al. | |
| 9,103,930 B2 | 8/2015 | Paulson et al. | |
| 9,110,187 B2 | 8/2015 | Muyzert et al. | |
| 9,151,857 B2 | 10/2015 | Manin | |
| 9,594,174 B2 | 3/2017 | Goujon et al. | |
| 9,841,519 B2 | 12/2017 | Rouquette | |
| 2004/0257913 A1 | 12/2004 | Ray et al. | |
| 2005/0034917 A1 | 2/2005 | Mathiszik et al. | |
| 2007/0056795 A1 | 3/2007 | Cox et al. | |
| 2007/0104028 A1 | 5/2007 | Van Manen et al. | |
| 2007/0265786 A1 | 11/2007 | Ozdemir et al. | |
| 2008/0037369 A1 | 2/2008 | Hentati | |
| 2008/0049551 A1 | 2/2008 | Muyzert et al. | |
| 2008/0225641 A1 | 9/2008 | Van Manen et al. | |
| 2009/0012711 A1 | 1/2009 | Harmon | |
| 2009/0052277 A1 | 2/2009 | Swanson | |
| 2009/0296529 A1 | 12/2009 | Boergen et al. | |
| 2010/0100330 A1 | 4/2010 | Burkholder et al. | |
| 2010/0195438 A1 | 8/2010 | Goujon | |
| 2010/0195439 A1 | 8/2010 | Muyzert | |
| 2010/0202251 A1 | 8/2010 | Ozdemir et al. | |
| 2010/0225324 A1 | 9/2010 | Strack et al. | |
| 2010/0265797 A1 | 10/2010 | Robertsson et al. | |
| 2010/0286922 A1 | 11/2010 | Poletto | |
| 2010/0302909 A1 | 12/2010 | Muyzert et al. | |
| 2011/0061454 A1 | 3/2011 | Vornbrock et al. | |
| 2011/0080808 A1 | 4/2011 | Muyzert et al. | |
| 2011/0082646 A1 | 4/2011 | Halliday et al. | |
| 2011/0082647 A1 | 4/2011 | Edme et al. | |
| 2011/0085417 A1 | 4/2011 | Ronnow | |
| 2011/0085419 A1 | 4/2011 | Ronnow et al. | |
| 2011/0141849 A1 | 6/2011 | Brittan | |
| 2011/0242933 A1 | 10/2011 | Maissant et al. | |
| 2011/0249530 A1 | 10/2011 | Liu et al. | |
| 2012/0026834 A1 * | 2/2012 | Muyzert | G01V 1/20 |
| | | | 367/58 |
| 2012/0035852 A1 | 2/2012 | Edme | |
| 2012/0081999 A1 | 4/2012 | Halliday et al. | |
| 2012/0113749 A1 | 5/2012 | Edme et al. | |
| 2012/0137781 A1 | 6/2012 | Hill et al. | |
| 2012/0250460 A1 | 10/2012 | Edme et al. | |
| 2012/0253680 A1 | 10/2012 | Thompson et al. | |
| 2012/0253683 A1 | 10/2012 | Edme et al. | |
| 2012/0269033 A1 | 10/2012 | Maples et al. | |
| 2013/0272091 A1 | 10/2013 | Yilmaz | |
| 2013/0315036 A1 | 11/2013 | Paulson et al. | |
| 2014/0022861 A1 | 1/2014 | Edme et al. | |
| 2014/0219053 A1 | 8/2014 | Goujon et al. | |
| 2014/0219055 A1 | 8/2014 | Goujon et al. | |
| 2016/0025875 A1 | 1/2016 | Friedly et al. | |
| 2016/0334523 A1 | 11/2016 | Edme | |
| 2017/0212259 A1 | 7/2017 | Degner | |
| 2017/0350996 A1 | 12/2017 | Andersen | |

FOREIGN PATENT DOCUMENTS

| | | |
|---|---|---|
| EP | 0932843 B1 | 2/2005 |
| EP | 1257849 B1 | 1/2009 |
| EP | 1454169 B1 | 11/2013 |
| EP | 2293116 B1 | 7/2014 |
| FR | 2738642 A1 | 7/1997 |
| GB | 1256304 | 12/1971 |
| GB | 2456313 B | 5/2010 |
| KR | 20110042276 A | 4/2011 |
| RU | 28923 U1 | 4/2003 |
| RU | 32290 U1 | 9/2003 |
| WO | 9219991 A1 | 11/1992 |
| WO | 2001/59482 A1 | 8/2001 |
| WO | 2003/036331 A1 | 5/2003 |
| WO | 2005/017563 A1 | 2/2005 |
| WO | 2010/048906 A2 | 5/2010 |
| WO | 2010/090949 A2 | 8/2010 |
| WO | 2012/015520 A1 | 2/2012 |
| WO | 2013/090544 A1 | 6/2013 |
| WO | 2013/150452 A1 | 10/2013 |

OTHER PUBLICATIONS

International Preliminary Report on Patentability issued in related PCT application PCT/US2015/011742 dated Jul. 28, 2016, (12 pages).

Office Action Issued in cross referenced CN application 201480007162.6 dated Oct. 10, 2016 (31 pages).

Office Action Issued in cross referenced CN application 201480007162.6 dated Jul. 10, 2017 (8 pages).

International Preliminary Report on patentability for the cross referenced International patent application PCT/US2014/013866 dated Aug. 4, 2015 (9 pages).

(56) References Cited

OTHER PUBLICATIONS

International Preliminary Report on Patentability for the cross referenced International patent application PCT/US2014/051971 dated Feb. 23, 2016 (5 pages).
Office Action No. 67990 issued in related MX application MX/a/2015/008000 dated Aug. 26, 2016, 7 pages.
Office Action issued in related RU application 2015131023 dated Apr. 19, 2016, 16 pages.
Decision on Grant issued in related RU application 2015131023 dated Jul. 21, 2016, 23 pages.
Communication issued in related EP Application No. 14746018.2 dated Feb. 17, 2016, 7 pages.
Extended EP Search Report issued in related EP Application No. 15177756.2 dated Jan. 5, 2016, 7 pages.
Supplementary EP Search Report issued in related EP Application No. 14746018.2 dated Jan. 18, 2016, 3 pages.
Barr, F.J., "Dual-Sensor OBC Technology," The Leading Edge, Jan. 1997. vol. 16(1).
Barr, et al., "Attenuation of Water-col. Reverberations Using Pressure and Velocity Detectors in Water-Bottom Cable," SEG Annual International, Oct. 1989.
Criss, "Another look at full-wave seismic imaging," First Break, Jun. 2007. vol. 25.
Curtis, et al, "Seismic interferometry—turning noise into signal," The Leading Edge, Sep. 2006.
De Meersman, et al., "A Complex SVD-Polarization Filger for Ground Roll Attenuation on Multi-Component Data," EAGE 67th Conference and Exhibition, Jun. 2005.
Dey, et al., "Noise suppression on Geophone data using microphone measurements," Crewes Research Report, 2000. vol. 12.
Drijkoningen, "Design of Seismic Network in LOFAR: Testing at Exloo Test-Site," Jul. 2007.
Drijkoningen, et al., "Project Plan of the Seismic Application in LOFAR,"Sep. 2007.
Edme, et al., "Receiver Function Method in Reflection Seismology," Geophysical Journal International, 2008.
Edme, et al, "Receiver Function Decomposition of OBC Data: Theory," Geophysical Journal International, 2009. vol. 177(3).
Greensted, "The Lab Book Pages: Delay Sum Beamforming an online collection of electronics information," Ghe Lab Book Pages, Oct. 2012 retrieved at http://www.labbookpages.co.uk/audio/beamforming/delaySum.html on Feb. 7, 2017.
Halliday, et al., "Interometric surface-wave isolation and removal," Geophysics, Sep.-Oct. 2007. vol. 72(5).
Digital Sensors, ION Geophysical 2009 retrieved on Mar. 17, 2010 at http://www.iongeo.com/Land_Imaging/Digital_Sensors/.
Sensor Geophones, ION Geophysical 2009 retrieved on Mar. 17, 2010 at http://www.iongeo.com/Land_Imaging/Geophones/.
Karsli, et al., "Using the Wienner-Levison Algorithm to Supress Ground Roll," Journal of Applied Geophysics, Mar. 2004. vol. 55(3-4).
Kragh, et al., "Ground Roll and Polarization," First Break, Sep. 1995. vol. 13(9).
Robertsson, et al., "Wavefield Separation using Densely Deployed Three-Component Single-Sensor Groups in Land Surface-Seismic Recordings," Geophysics, Sep. 2002 vol. 67(5).
Snieder, "Extracting the Green's function of attenuating heterogeneous acoustic media from uncorrelated waves," J. Acoust. Soc. Am. May 2007. vol. 121(5).
Snieder, et al., "Cancellation of spurious arrivals in Green's function extraction and the generalized optical theorem," Physical Review E. 2008. vol. 78.
Van Dalen, et al., "G035: Characterization of Subsurface Parameters with Combined Fluid-Pressure and Particle-Velocity Measurements," 70th EAGE Conference & Exhibition, Jun. 9, 2008.
Kennett, "Seismic wave propagation in stratified media," Cambridge Universion Press, 1983.
Sercel Broshure, "428XL Land Seismic Acquisition System," pp. 1-12, retrieved at http://www.sercel.com/products/Pages/428xl.aspx on Feb. 7, 2017.
Pham, et al., "Investigation of ground rotational motions caused by direct and scattered P-waves from the Mar. 4, 2008 TAIGER explosion experiment," Journal of Seismology, Kluwer Academic Publishers, vol. 16, No. 4.
International Search Report and Written Opinion for the related International patent application PCT/US2014/051971 dated Dec. 11, 2014.
Examination Report for the equivalent Australian patent application 2014212354 dated May 2, 2017.
Office Action for the equivalent GCC patent application of GC 2014-26355 dated Jun. 3, 2017.
Non final office action for the cross referenced U.S. Appl. No. 15/110,986 dated Feb. 22, 2018.
International Search Report and Written Opinion for the cross referenced International patent application PCT/US2015/011742 dated Apr. 10, 2015.
Office Action for the cross referenced GCC patent application GC2014-27799 dated Oct. 3, 2017.
Russian Search Report; Registration No. 2016140550/28 (064682); dated Dec. 26, 2019.

* cited by examiner

COMPUTING ROTATION DATA USING A GRADIENT OF TRANSLATIONAL DATA

CROSS REFERENCE TO RELATED APPLICATIONS

This application is a divisional application of U.S. patent application Ser. No. 14/158,115 that was filed on Jan. 17, 2014 and was published as United States Patent Application Publication No. 2014-0219055, which in turn claims the benefit under 35 U.S.C. § 119(e) of U.S. Provisional Patent Application Ser. Nos. 61/868,429 filed Aug. 21, 2013; and 61/759,466 filed Feb. 1, 2013; all of which are incorporated herein by reference in their entireties.

BACKGROUND

Seismic surveying is used for identifying subterranean elements of interest, such as hydrocarbon reservoirs, freshwater aquifers, gas injection zones, and so forth. In seismic surveying, seismic sources are activated to generate seismic waves directed into a subterranean structure.

The seismic waves generated by a seismic source travel into the subterranean structure, with a portion of the seismic waves reflected back to the surface for receipt by seismic sensors (e.g., geophones, accelerometers, etc.). These seismic sensors produce signals that represent detected seismic waves. Signals from the seismic sensors are processed to yield information about the content and characteristics of the subterranean structure.

A land-based seismic survey arrangement can include a deployment of an array of seismic sensors on the ground. A marine survey arrangement can include placing a seabed cable or other arrangement of seismic sensors on the seafloor.

SUMMARY

Translational data in a first direction is measured by particle motion sensors contained in an elongated housing of a sensor device provided at an earth surface. The particle motion sensors are spaced apart along a second, different direction along a longitudinal axis of the elongated housing. Rotation data around a third direction is computed based at least in part on computing a gradient of the translational data with respect to the second direction.

Other features will become apparent from the following description, from the drawings, and from the claims.

BRIEF DESCRIPTION OF THE DRAWINGS

Some embodiments are described with respect to the following figures.

DETAILED DESCRIPTION

In seismic surveying (marine or land-based seismic surveying), seismic sensors are used to measure seismic data, such as displacement, velocity, or acceleration. Seismic sensors can include geophones, accelerometers, microelectromechanical systems (MEMS) sensors, or any other type of sensors that measure translational motion of the surface in one or more directions. In the ensuing discussion, a seismic sensor that measures translational motion is referred to as a particle motion sensor. A particle motion sensor can refer to any of the sensors listed above.

An arrangement of particle motion sensors can be provided at (or proximate) a ground surface or earth surface to measure seismic waves reflected from a subterranean structure, in response to seismic waves (or impulses) produced by one or more seismic sources and propagated into an earth subsurface. As described herein a ground surface and/or earth surface is any land surface or bottom surface of a body of water, such as a seafloor, lake floor or wetland. A particle motion sensor provided at a ground surface can refer to a particle motion sensor that is placed in contact with the ground surface, partially buried in the ground surface, or completely buried in the ground surface up to a predetermined depth (e.g., up to a depth of less than 5 meters). A particle motion sensor at (or proximate) the earth surface can record the vectorial part of an elastic wavefield just below the free surface (i.e., ground surface).

In addition to measuring translational data, it may be useful to obtain rotation data when performing survey data acquisition for various purposes. For example, rotation data can be combined with translational data measured by particle motion sensors to eliminate or attenuate noise from the measured translational data. Examples of noise include ground-roll noise or another type of noise (such as ambient noise) that can travel along the earth's surface. Ground-roll noise can be produced by a seismic source or other source, such as cars, engines, pumps, and natural phenomena such as wind and ocean waves. The ground-roll noise travels generally horizontally along an earth surface towards seismic receivers. The horizontally traveling seismic waves, such as Rayleigh waves or Love waves, are undesirable components that can contaminate seismic survey data.

Although reference is made to using rotation data to attenuate noise, it is noted that rotation data can be used for other purposes, whether in the context of a land-based survey acquisition or marine-based survey acquisition in which a seabed cable or other arrangement of seismic sensors is placed on the seafloor. For example, rotation data and translational data can be used in performing various seismic data processing algorithms, including, among others, wavefield interpolation, wavefield extrapolation, wavefield reconstruction, wavefield regularization, P- and S-wave separation, apparent velocity estimation, near-surface characterization, seismic sensor calibration, and seismic imaging.

Wavefield interpolation refers to estimating (interpolating) wavefields at locations where seismic sensors are not provided. P- and S-wave separation refers to separating compressional (P) waves from shear (S) waves in measured seismic survey data. Apparent velocity estimation refers to estimating a characteristic of the seismic wavefield known as ray parameter or horizontal slowness, from which seismic wave velocities at various points in a subterranean structure can be retrieved. Near-surface characterization refers to estimating the shallow earth elastic properties. Seismic sensor calibration refers to calibrating a seismic sensor to compensate for any non-ideal characteristic of the seismic sensor.

Rotation data refers to a rate of rotation (or change in rotation over time) about a specific axis, such as about the x axis (which can also be referred to as a horizontal inline axis) and/or about the y axis (which can also be referred to as a horizontal crossline axis). In accordance with some implementations, rotation data can be derived based on translational data measured by particle motion sensors. In this way, a separate rotational sensor would not have to be provided in survey equipment for the purpose of measuring rotation data.

Figure 1:
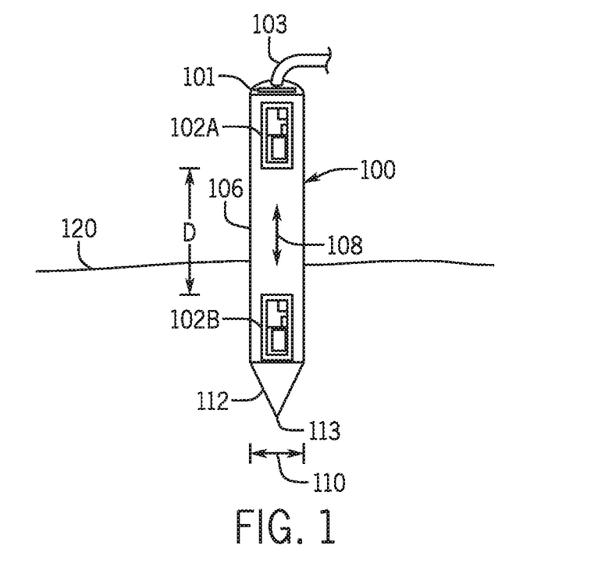
FIG. 1 is a schematic diagram of a sensor device according to some implementations.

FIG. 1 depicts an example seismic sensor device 100 that includes a first sensor component 102A and a second sensor component 102B. The sensor components 102A and 102B are included inside a single housing 106 of the sensor device 100. The seismic sensor device 100 can also include a power source, such as a battery, a solar cell, and so forth. In manufacturing the seismic sensor device 100, the housing 106 can be sealed to protect the sensor components 102A and 102B.

The housing 106 generally has an elongated shape that allows the sensor components 102A and 102B to be spaced apart along a longitudinal axis 108, by a distance D, of the sensor device 100. In some implementations, the sensor components 102A and 102B are co-axial along the longitudinal axis of the housing 106. The elongated housing 106 can be in the form of a hollow tube, stick, or other elongated structure. The longitudinal axis 108 is the axis along a dimension of the sensor device 100 which is longer than other dimensions of the sensor device 100, such as a width dimension 110 or a depth dimension (not shown) that corresponds to a thickness of the housing 106.

The sensor device 100 having the elongated housing 106 can be referred to as a spike-shaped sensor device.

The housing 106 can be made out of a material, such as plastic, metal, and so forth. According to an example embodiment, the housing 106 may not resonate within a bandwidth of interest for target signals to be measured. In some examples, the bandwidth of interest can be in the range between 1 to 250 Hertz (Hz). In other examples, the housing 106 may exhibit resonance; in such examples, the resonance can be removed by processing, or the resonance can be compensated for by processing.

By arranging the sensor components 102A and 102B in the elongated housing 106 as shown in FIG. 1, the sensor components 102A and 102B are spaced apart along just the longitudinal axis 108. In other words, in some implementations, the sensor device 100 does not include sensor components that are spaced apart in any other direction (other than a direction parallel to the longitudinal axis).

FIG. 1 shows a portion of the sensor device 100 (not to scale) being below the ground surface 120, and a portion of the sensor device 100 being above the ground surface 120. According to an embodiment, the configuration can include a sensor 102B below the ground surface and a sensor 102A above the ground surface. A sensor can also be positioned at or proximate the ground surface 120. According to an embodiment, a majority of the sensor device 100 can be below the ground surface 120. According to another embodiment a majority of the sensor device 100 can be above the ground surface 120. Another embodiment can have approximately half the sensor device 100 above and half the sensor device 100 below the ground surface 120. Another embodiment can have all of the sensor devices 100 (or essentially all the sensor devices 100) below the ground surface 120.

In some examples, to obtain rotation data with respect to a horizontal axis at a ground surface 120, two vertically spaced horizontal orientated particle motion sensors can be provided in the sensor device 100. The sensor device 100 can then be vertically arranged at or near the ground surface 120. It should be understood that additional sensors to 102A and 102B can be located along the length of the sensor device 100 to provide redundancy for failed sensors and/or additional measurements.

The sensor device 100 can include a communication interface circuit 101, which is connected to a communications medium 103 (e.g., electrical cable, fiber optic cable, etc.,). The communications medium 103 can be a wireless medium over which data can be communicated. The communication interface circuit 101 is connected to the sensor components 102A and 102B. Data acquired by the sensor components 102A and 102B are transferred to the communication interface circuit 101, which in turn transmits the acquired data over the communications medium 103 to a remote station, which can be a recording station, a computer, and so forth. According to other embodiments, a memory can be provided and incorporated with the sensor device 100. The memory can also be separate from the sensor device 100 and connected by wire, or short range wireless technology such as Wi-Fi or Bluetooth. An arrangement where memory is included can be referred to in the commercial art as a "blind" node arrangement. In this "blind" node arrangement, a communications interface circuit 101 may not have to be present. It should also be appreciated that a combination of a "blind" node arrangement and a wired node and/or a wireless node arrangement can be used.

In further implementations, the sensor device 100 may contain a sensing element (or sensing elements) to measure a tilt and/or an azimuth of the sensor device 100, where tilt is measured with respect to the z axis. This sensing element(s) can be part of the sensor components 102A and 102B that measure translation and rotation. For example, if the sensor components 102A and 102B include MEMS accelerometers that measure down to DC, then the MEMS accelerometers can provide tilt data. If the sensor components 102A and 102B include geophones, then a tilt meter can be added. An azimuth sensor (e.g., magnetometer, compass) can be added, so that measured horizontal components (e.g., translational data or rotation data in the x or y axis) can be rotated with respect to a global reference. If an azimuth sensor is not provided, then the sensor device 100 can be oriented azimuthally to a predefined azimuth when the sensor device 100 is planted.

Also, control circuitry (not shown) can be included in the sensor device 100 to control the particle motion sensors. Additionally, an analog-to-digital converter and other components may be included, such as in the communication interface circuit 101, to convert signals measured by the particle motions sensors into digital form. The components in the sensor device 100 may be powered by a battery, a solar panel, or through a wired or wireless connection.

The bottom portion of the sensor device 100 may include a spike 112 for driving the sensor device 100 into the ground surface 120. The spike 112 has a generally sharp tip 113 that allows for easier insertion of the sensor device 100 into the ground surface 120 to form a connection between the earth and the sensor device 100. A user or machine can push the spike 112 into the ground surface 120 to cause at least a portion of the sensor device 100 to be buried in the earth beneath the ground surface 120. For example, the sensor device 100 can be driven into the ground surface using a hammer, either by a user or in an automated manner by a machine. In different examples, the sensor device 100 can be screwed into the ground by a wrench or planted in a prepared borehole with reduced disturbance of the surrounding earth. As another example, a borehole may be dug and the sensor device 100 may be placed therein. The borehole may be refilled after positioning the sensor device 100. Instead of using the spike 112, the housing 106 of the sensor device 100 can have a V or screw shape to facilitate planting into the ground surface 120 (protrusions can be formed on the outer wall of the housing 106 in the form of a helical screw).

In some cases, the sensor device 100 is partially buried beneath the ground surface 120, with a portion of the sensor device 100 protruding above the ground surface 120. In other cases, the sensor device 100 can be completely buried in the ground surface, up to a predetermined depth (as discussed above).

In some examples, the sensor components 102A and 102B are sensor chips. A sensor chip refers to an integrated circuit device that includes a substrate (e.g., semiconductor substrate) on which particle motion sensors can be provided. For example, the particle motion sensors that can be provided in the sensor chip 102A or 102B can include MEMS particle motion sensors, such as MEMS accelerometers. A MEMS particle motion sensor can include a micro element (e.g., a micro cantilever) that is moveable in response to particle motion, where the movement of the micro element can be detected by a sensing element. In other examples, the sensor components 102A and 102B can include other types of particle motion sensors. It should be noted that the MEMS particle motion sensors do not have to be on the "chip," but that is an option. An example of a MEMS and electronics configuration is disclosed in U.S. Patent Application Publication No. 2013/0315036.

Figure 2A:
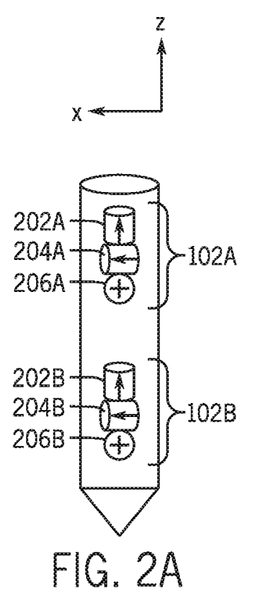
FIGS. 2A-2C are schematic diagrams of a sensor device according to various implementations.
Figure 2B:
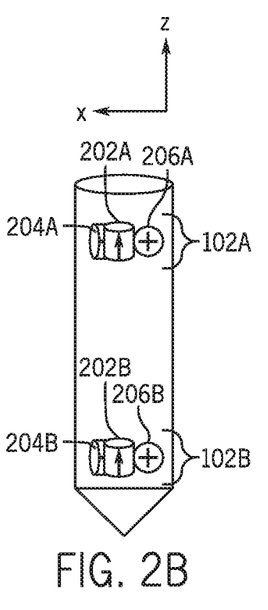

In some implementations, the particle motion sensors that are provided in the sensor component 102A or 102B can measure translational data in multiple directions, such as the x, y and z directions. Examples of such arrangements are shown in FIGS. 2A and 2B, where the sensor component 102A or 102B includes a respective z sensor 202A or 202B (for measuring translational data along the z axis), a respective x sensor 204A or 204B (for measuring translational data along the x axis), and a respective y sensor 206A or 206B (for measuring translational data along the y axis).

Figure 2C:
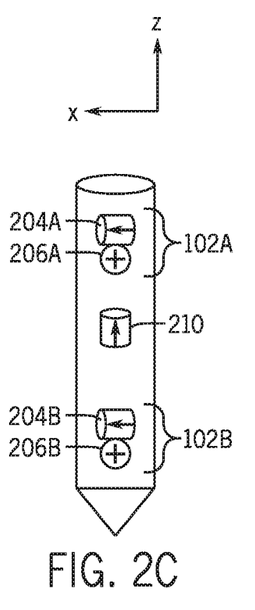

In further examples, such as shown in FIG. 2C, the sensor component 102A or 102B can include just a respective x sensor 204A or 204B and a respective y sensor 206A or 206B. In the arrangement of FIG. 2C, a separate z sensor 210 can be provided for measuring translational data along the z direction. The z sensor 210 can be positioned in the middle between sensor components 102A and 102B. In other examples, the z sensor 210 can be positioned elsewhere, such as in either 102A or 102B. In some implementations, a pair of sensors (e.g., 204A and 204B, or 206A and 206B, or 202A and 202B) can be hardwired together to provide the sum and the difference as outputs. The sum can help reduce the non-correlated noise (between the elements of a pair) and the difference provides a gradient.

In other implementations, the sensor component 102A can include particle motion sensors to measure in just the x and y axes, while the sensor component 102B can include particle motion sensors to measure the x, y and z axes, and vice versa.

Note that the particle motion sensors in a given component (e.g., 102A) within the same sensor device 100 do not have to be orientated in the same direction as the other sensor component (e.g., 102B). If the relative angle between the sensor components 102A and 102B is known, then the measured data by the pair of particle motion sensors can be corrected using vector rotation.

Figure 3:
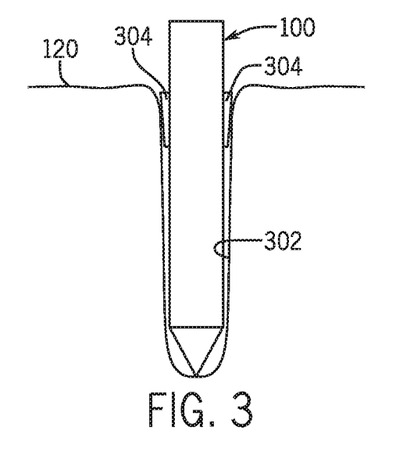
FIG. 3 is a schematic diagram of a sensor device partially buried in a hole, according to some implementations.

As shown in FIG. 3, a driving action on the sensor device 100 (e.g., repeated hammer impacts on the sensor device 100) drives the sensor device 100 into a hole 302 extending from the ground surface 120. The driving action on the sensor device 100 may have caused the hole 302 to widen near the earth surface 302. The widening of the hole 302 near the earth surface 300 may cause resonances in the sensor device 100 that may be observed in measured seismic survey data. Such resonances can be reduced by enhancing the coupling of the sensor device 100 with the surrounding earth. This can be achieved by inserting wedges 304 into a gap between the sensor device 100 and the surrounding earth.

Figure 4:
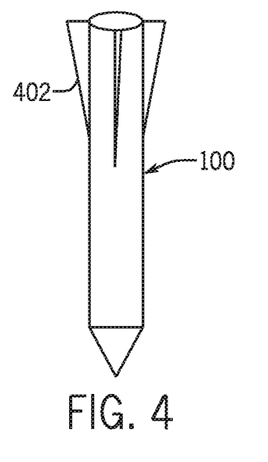
FIG. 4 is a schematic diagram of a sensor device according to further implementations.

In other implementations, as shown in FIG. 4, the sensor device 100 can be provided with wings or fins 402 (e.g., vertical fins), which allows the upper portion of the sensor device 100 to be coupled to the surrounding earth when the sensor device 100 is driven into the hole 302 (FIG. 3). In further implementations, a hole can be dug, the sensor device 100 is positioned in the hole, and the hole is back-filled to provide good coupling. In other implementations, a coupling device can first be planted or buried into the ground, and the sensor device 100 can then be engaged with the coupling device.

The rotation data in the three spatial axes (k=x, y, z) is given by:

$$R_k = \frac{1}{2}\left[\frac{\partial v_i}{\partial j} - \frac{\partial v_j}{\partial i}\right], \quad \text{(Eq. 1)}$$

where $v_i$ represents the particle velocity along the i (i=x, y, z) axis, and $v_j$ represents particle velocity along the j (j=x, y, z) axis. In the foregoing nomenclature, the i axis is orthogonal with respect to the j axis, and both the i and j axes are orthogonal with respect to the k axis. The gradient $$\frac{\partial v_i}{\partial j}$$

represents a spatial derivative of $v_i$ with respect to the j axis, and the gradient $$\frac{\partial v_j}{\partial i}$$

represents a spatial derivative of $v_j$ with respect to the i axis. The particle velocity measurements can be made at or just under the ground surface 120 (FIG. 1). At or just under the ground surface 120, the following relationships for deriving rotation data along the x and y axis may apply:

$$R_y = -\frac{\partial v_z}{\partial x} = +\frac{\partial v_x}{\partial z}, \quad \text{(Eq. 2)}$$

$$R_x = \frac{\partial v_z}{\partial y} = -\frac{\partial v_y}{\partial z}, \quad \text{(Eq. 3)}$$

where $v_x$ represents particle velocity along the x direction, $v_y$ represents particle velocity along the y direction, and $v_z$ represents particle velocity along the z direction. This implies that the rotation components around a horizontal axis, $R_y$ or $R_x$, can be derived by measuring just one of the terms in the right hand side of Eq. 2 or 3.

Although reference is made to deriving rotation data based on measured velocities in the foregoing examples, it is noted that other types of translational data, including displacement or acceleration data, can be used for obtaining rotation data in a manner similar to that described in connection with Eqs. 2 and 3 above.

A characteristic of providing the sensor device 100 at the ground surface 120 (or free surface between the air and a solid or between the water and a solid) is that a spatial gradient and rotation become equivalent to one another, as expressed by Eq. 2 or 3.

By taking advantage of such characteristic when the sensor device is provided at the ground surface 120, measurements of the vertical gradient of horizontal translational data in a spike-shaped sensor device can be used to obtain the rotation data. A vertical gradient refers to a gradient taken with respect to the z axis. Horizontal translation data refers to translational data along the x or y axis. The vertical gradient of horizontal translational data can be expressed as $$\frac{\delta v_x}{\delta z} \text{ or } \frac{\delta v_y}{\delta z},$$

for example.

In the example arrangement of FIG. 1, the foregoing vertical gradients of horizontal translational data can be obtained using measurements of closely spaced apart x sensors 204A and 204B, or closely spaced apart y sensors 206A and 206B.

In addition to obtaining rotation data using measurements of translational data by particle motion sensors, divergence data can also be derived using the translational data, in accordance with further implementations.

The divergence of a wavefield, $\nabla \cdot V$, can be represented as:

$$\nabla \cdot V = \sum_{i=1}^{3} \frac{\partial v_i}{\partial i}, \quad \text{(Eq. 4)}$$

In Eq. 4, i=(x, y, z) represent the three orthogonal axes. At the free surface, Eq. 4 is expressed as:

$$\nabla \cdot V = \frac{2\mu}{\lambda + 2\mu} \left( \frac{\partial v_x}{\partial x} + \frac{\partial v_y}{\partial y} \right) = -\frac{2\mu}{\lambda} \left( \frac{\partial v_z}{\partial z} \right), \quad \text{(Eq. 5)}$$

Eq. 5 indicates that, at the free surface, the divergence of a wavefield, can be measured by just one partial derivative term $$\left( \frac{\partial v_z}{\partial z} \right).$$

In Eq. 5, the parameters $\mu$ and $\lambda$ are Lame parameters. The ratio of the Lame parameters $\mu$ and $\lambda$ is a function of the near-surface P- and S-wave velocities $\alpha$ and $\beta$:

$$\frac{\mu}{\lambda} = \frac{\beta^2}{\alpha^2 + \beta^2}. \quad \text{(Eq. 6)}$$

The partial derivative in the right-hand side of Eqs. 2, 3, and 5 can be measured by differentiating measurements from closely spaced apart particle motion sensors, such as closely spaced apart particle motion sensors depicted in FIG. 1. In some examples, the particle motion sensors are spaced apart along the longitudinal axis 108 by a distance D that is less than or equal to about 0.3 times a wavelength of a target signal for measurement by the sensor device 100. In further examples, the particle motion sensors are spaced apart along the longitudinal axis 108 by a distance D that is less than or equal to about 0.1 times a wavelength of a target signal for measurement by the sensor device 100. Note that the foregoing distances D between the particle motion sensors are applicable to computing the rotation data according to Eqs. 2 and 3 and/or the divergence data according to Eq. 5.

To achieve greater accuracy in computing rotation data and/or divergence data as discussed above based on measured translational data, the particle motion sensors are selected or configured such that the impulse responses of the particle motions sensors within the same sensor device 100 are similar to one other to within a specified threshold difference of one other. This may be achieved by selecting matching pairs of particle motion sensors, or by applying calibration coefficients to measurement data acquired by the particle motion sensors.

Figure 5:
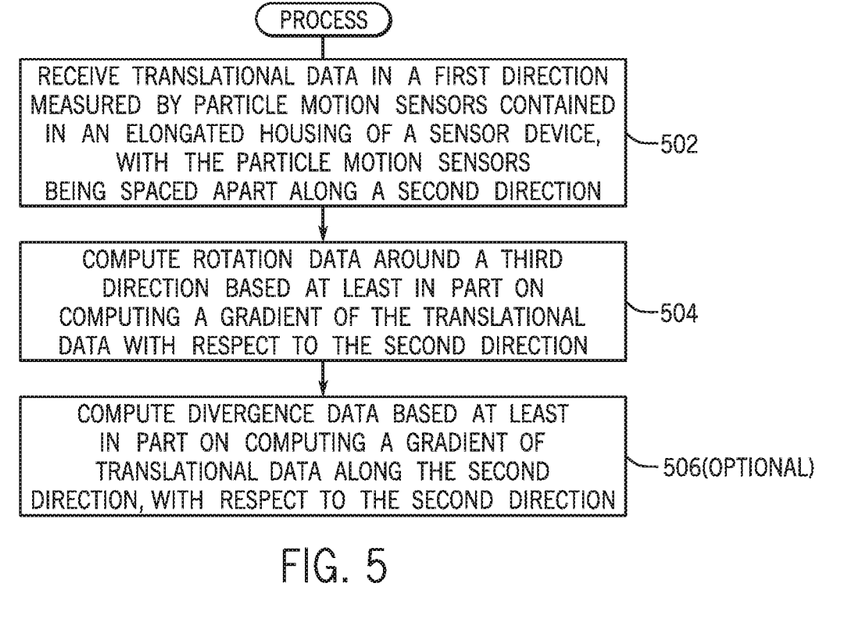
FIG. 5 is a flow diagram of a process according to some implementations.

FIG. 5 is a flow diagram of a process according to some implementations. The process of FIG. 5 can be performed by a computer system that receives measurements made by one or more sensor devices 100. For example, the computer system may be coupled to the one or more sensor devices 100 over the communications medium 103.

The computer system receives (at 502) translational data in a first direction (e.g., x or y direction) measured by particle motion sensors contained in the elongated housing 106 (FIG. 1) of the sensor device 100. The particle motion sensors are spaced apart along a second, different direction (e.g., z direction) along the longitudinal axis 108 (FIG. 1) of the elongated housing 106.

The computer system computes (at 504) rotation data around a third direction (e.g., y or x direction) based at least in part on computing a gradient of the translational data with respect to the second direction, such as according to Eq. 2 or 3 set forth above.

In some examples, the computer system can also compute (at 506) divergence data based at least in part on computing a gradient of translational data along the second direction, with respect to the second direction, such as according to Eq. 5 above.

As shown in FIG. 2A or 2B, in some implementations, the sensor device 100 can include two sets (102A, 102B) of three orthogonally oriented particle motion sensors. This configuration allows computation of the two orthogonal rotation components, $R_x$ and $R_y$, around respective horizontal axes x and y. The particle motion sensors of the set may be positioned with a very small vertical separation inside the sensor device 100 (as discussed above). The separation between the sets of particle motion sensors may not have to be the same for different directions (e.g., x and y direction), so long as the different separations are known.

Using the sensor device 100 of FIG. 2A or 2B, the following data can be obtained: translational data (including $v_x$, $v_y$, $v_z$), rotation data (including $R_x$, $R_y$), and divergence data ($\nabla \cdot V$). With the sensor device 100 of FIG. 2C, the same types of data can be obtained, except the divergence data. The foregoing data can be transmitted over the communications medium 103 (FIG. 1) to a station.

In some examples, to obtain more accurate estimates of the translational data, translational data measurements in a given direction obtained by a pair of particle motion sensors for the given direction can be aggregated (e.g., summed, averaged, etc.,). For example, as shown in FIG. 2A or 2B, the translational data measurements by the z sensors 202A and 202B can be aggregated to obtain a better estimate of the wavefield in the z direction, where this estimate is centered at the same depth as the obtained rotation data and divergence. Similarly, the translational data measurements by the x sensors 204A and 204B can be aggregated (at a computer system) to obtain a better estimate of the wavefield in the x direction, and the translational data measurements by the y sensors 206A and 206B can be aggregated (at the computer system) to obtain a better estimate of the wavefield in the y direction.

In some examples, the separation (D in FIG. 1) between the sets of particle motion sensors in the sensor device is between one centimeter and one meter. More specifically, the separation, D, can be between 5 centimeters and 50 centimeters, although other ranges are possible, such as on the order of centimeters.

The amplitude of the difference signal (difference between the translational data acquired by a first particle motion sensor and the translational data acquired by a second particle motion sensor, computed for determining the partial derivative in Eq. 2, 3, or 5) may be relatively small compared to the raw particle motion sensor output, because of the relatively small distance between the two particle motion sensors. To allow for an accurate determination of the rotation data and/or divergence data according to some implementations, the particle motion sensors used in a pair should be well matched in terms of phase and amplitude frequency response. In some examples, MEMS particle motion sensors may be well suited for some implementations, since they have a zero (or close to zero) phase response, and their amplitude response is flat at different frequencies.

In addition, MEMS particle motion sensors may be able to measure gravity, which can be used to calibrate the sensitivities of the MEMS particle motion sensors. As a result, use of MEMS particle motion sensors may lead to more accurate computation of partial derivatives of translational data, such as those computed in Eq. 2, 3, or 5.

Use of MEMS particle motion sensors may also allow the sensor device 100 to have a reduced size, as compared to a sensor device that uses another type of particle motion sensors, such as geophones. A smaller sensor device 100 is easier to deploy.

To improve the accuracy of divergence data obtained by differentiating closely spaced z particle motion sensors, such as according to Eq. 5, the z particle motion sensors (e.g., 202A and 202B in FIG. 2A or 2B) within the same sensor device 100 can be seismically decoupled. Seismically decoupling z particle motion sensors may be achieved by placing a damper between the two sensors, such as by placing a material, such as rubber or other dampening material, between the sensors that serve to attenuate the seismic signals that propagate in the longitudinal axis 108 (FIG. 1) of the sensor device 100. Also, to achieve improved accuracy in obtaining divergence data, the pair of z particle motion sensors in the sensor device 100 are matched or calibrated to have almost identical amplitude and phase responses.

As noted above, in some implementations, a sensor device 100 can include a sensing element (e.g., a tilt meter) to measure a tilt of the sensor device 100 with respect to the z axis (vertical axis). A deviation from the vertical axis can be measured in two directions using tilt meters, or can be derived from the DC component for the particle motion sensor measurements. If the sensor device 100 is not oriented vertically (i.e., its longitudinal axis 108 is tilted from the z axis by more than a predefined angle), then measurements by the particle motion sensors of the sensor device 100 are corrected for the tilt.

Moreover, the orientation of the horizontal (x or y) particle motions sensors with respect to geographical north (or any other horizontal azimuth) can be measured with a built in magnetometer or compass whose readings are recorded and transmitted once or multiple times during a survey. In other examples, the azimuth can be measured during or after planting of the sensor device 100, or derived from the measured translational data. The measured translation data from the horizontal particle motion sensors can be mathematically rotated using the measured azimuth angle.

Figure 6:
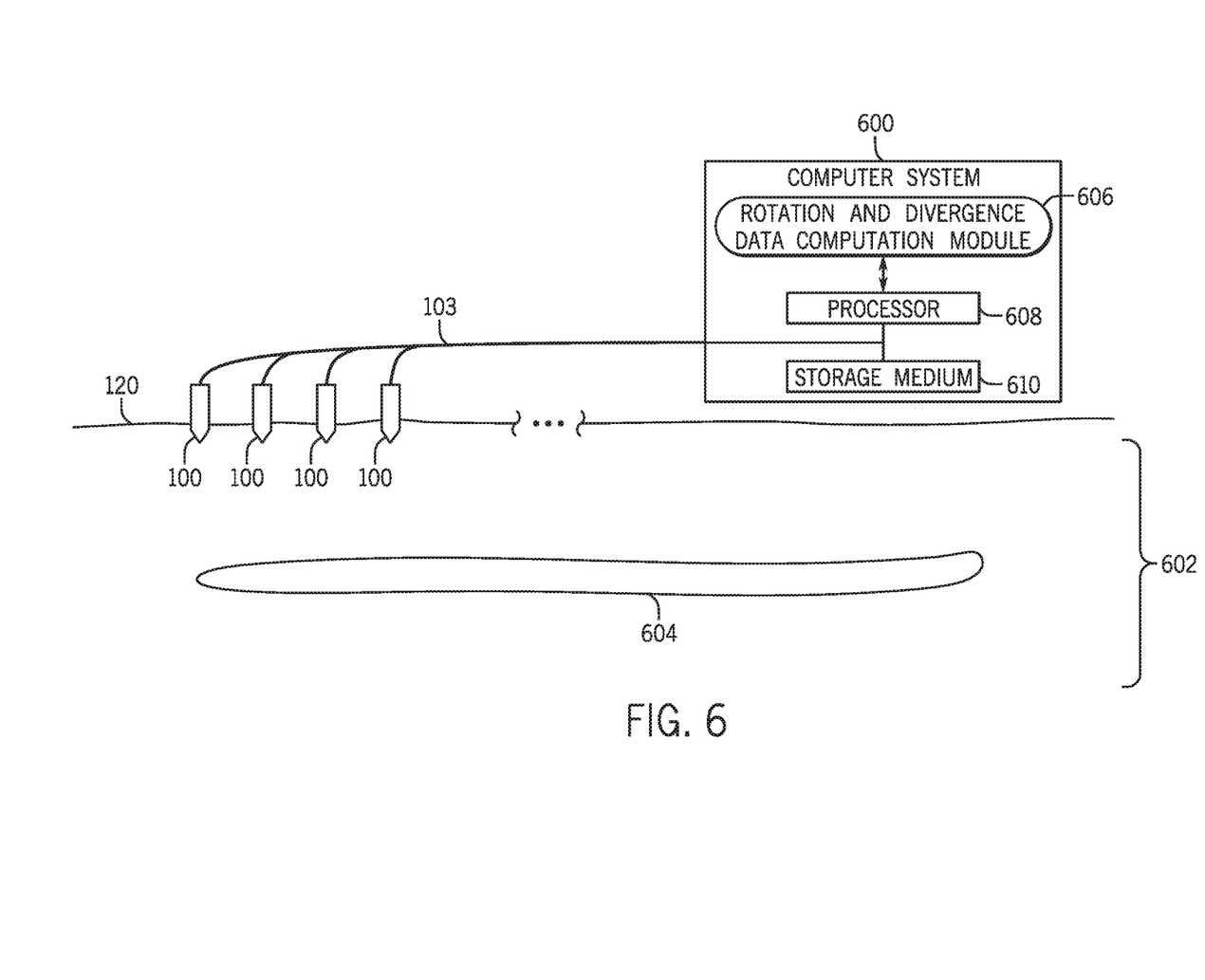
FIG. 6 is a schematic diagram of an example survey arrangement including sensor devices according to some implementations.

FIG. 6 is a schematic diagram of a land-based survey arrangement (including a seismic sensor system) that includes sensor devices 100 according to some implementations. In different examples, the sensor devices 100 can be deployed in a marine survey arrangement.

Measurements acquired by the sensor devices 100 are transmitted to a computer system 600, where the measurements are recorded (stored in a storage medium or storage media 610). In some examples, each sensor device 100 (or at least one of the sensor devices 100) can include the computer system 600, or at least one or more processors 608 and storage medium (or storage media) 610. The measurements are made by the sensor devices 100 in response to seismic waves produced by one or more seismic sources (not shown). The seismic waves are propagated into a subterranean structure 602, and reflected from a subterranean element 604 of interest. The reflected waves are detected by the sensor devices 100.

The computer system 600 includes a rotation and divergence data computation module 606, which can be implemented with machine-readable instructions that are executable on one or more processors 608. The rotation and divergence data computation module 606 can compute rotation data and divergence data as discussed above.

The processor(s) 608 can be coupled to the storage medium (or storage media) 610, which can store data, such as translational data received from the sensor devices 100.

The storage medium (or storage media) 610 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A seismic sensor device comprising:
   an elongated housing having a longitudinal axis and one end that is adapted to be input into an earth to form a connection between the earth and the elongated housing so that seismic signals transmitted through the earth, including a ground roll, will be transmitted to the elongated housing, wherein the one end of the elongated housing comprises a V shape and wherein one or more wedges are positioned in between the elongated housing and the earth; and
   a plurality of sets of particle motion sensors within the elongated housing, wherein the one or more wedges are configured to enhance a coupling of the plurality of the sets of particle motion sensors with the earth, and wherein the plurality of sets of particle motion sensors comprises:
      a first set of particle motion sensors configured to measure a first translational dataset along three orthogonal axes; and
      a second set of particle motion sensors configured to measure a second translational dataset along at least two of the three orthogonal axes, wherein a first particle motion sensor of the first set of particle motion sensors and a second particle motion sensor of the second set of particle motion sensors are co-axially located along one of the three orthogonal axes, and wherein the first particle motion sensor and the second particle motion sensor are spaced apart from one another along the one of the three orthogonal axes by a distance in a direction that extends longitudinally along the elongated housing, and
   wherein a processor is configured to:
      receive the first translational dataset along the three orthogonal axes from the first set of particle motion sensors;
      receive the second translational dataset along the at least two of the three orthogonal axes from the second set of particle motion sensors;
      calculate a gradient of translational data received by the plurality of sets of particle motions sensors based on the first translational dataset, the second translational dataset, and the distance; and
      calculate rotational data based at least in part on the gradient of translational data.

2. The seismic sensor device of claim 1, wherein the processor is in communication with a memory device.

3. The seismic sensor device of claim 1, further comprising:
   a power source in communication with the plurality of sets of particle motion sensors.

4. The seismic sensor device of claim 1, wherein the elongated housing comprises a hollow structure, wherein the plurality of sets of particle motion sensors is located inside the hollow structure.

5. The seismic sensor device of claim 4, wherein the hollow structure includes protrusions in the form of a helical screw on an outside of the elongated housing.

6. The seismic sensor device of claim 4, wherein the hollow structure includes protrusions on an outside of the housing that form vertical fins that extend in the direction that extends longitudinally along the elongated housing.

7. The seismic sensor device of claim 4, wherein the plurality of sets of particle motion sensors is configured to detect translation in a direction of a co-axial axis, and in directions that are orthogonal to the co-axial axis, and to transmit data corresponding to the translation to the processor.

8. The seismic sensor device of claim 7, wherein the processor is configured to determine the ground-roll noise based on the data corresponding to the translation along the co-axial axis and the translation in the directions that are orthogonal to the co-axial axis.

9. The seismic sensor device of claim 8, wherein the processor is configured to reduce the ground-roll noise from seismic signals recorded along the co-axial axis.

10. A method, comprising:
    providing a first set of seismic sensors and a second set of seismic sensors inside an elongated housing, the first set of seismic sensors and the second set of seismic sensors being made up of multi-axis particle motion sensors configured to measure translational data along at least two of three orthogonal axes, wherein a first sensor of the first set of seismic sensors and a second sensor of the second set of seismic sensors are co-axially located along one of the three orthogonal axes, and wherein the first sensor and the second sensor are spaced apart from one another by a distance along the one of the three orthogonal axes in a direction that extends longitudinally along the elongated housing, wherein a first end of the elongated housing comprises a V shape and wherein one or more wedges are positioned in between the elongated housing and an earth, wherein the one or more wedges are configured to enhance couplings of the first set of seismic sensors and the second set of seismic sensors with the earth, and wherein a processor is configured to:
       receive a first translational dataset along the three orthogonal axes from the first set of seismic sensors;
       receive a second translational dataset along the at least two of the three orthogonal axes from the second set of seismic sensors;
       calculate a gradient of translational data based on the first translational dataset, the second translational dataset, and the distance; and
       calculate rotational data based at least in part on the gradient of translational data;
    sealing the elongated housing so as to protect the multi-axis particle motion sensors, and
    providing a communication connection to the multi-axis particle motion sensors to communicate signals detected by the multi-axis particle motion sensors.

11. The method of claim 10, further comprising forming one end of the elongated housing to be sharp, so as to penetrate an earth surface.

12. The method of claim 10, further comprising providing, inside the elongated housing, one or more selected from the group consisting of a tilt sensor device.

13. The method of claim 10, wherein at least a portion of the first set of seismic sensors and at least a portion of the second set of seismic sensors are co-axial with respect to a direction in which they measure particle motion.

14. The seismic sensor device of claim 1, wherein one of the first set of particle motion sensors or the second set of particle motion sensors is configured to be located at a ground surface and a second of the first set of particle motion sensors or the second set of particle motion sensors is configured to be located proximate to the ground surface.

15. The seismic sensor device of claim 1, wherein one of the first set of particle motion sensors or the second set of particle motion sensors is configured to be located below a ground surface and a second of the first set of particle motion sensors or the second set of particle motion sensors is configured to be located proximate to the ground surface.

16. The seismic sensor device of claim 1, wherein the plurality of sets of particle motion sensors are configured so that they are vertically spaced along the seismic sensor device.

17. The method of claim 10, wherein the first set of seismic sensors and second set of seismic sensors are vertically spaced from one another.

18. The method of claim 10, further comprising:
providing a memory device inside the elongated housing.

19. The method of claim 10, further comprising:
coupling a computer system to at least one of the sets of seismic sensors.

\* \* \* \* \*